Dec. 14, 1965   M. A. ORDORICA ETAL   3,223,797
HORN BUTTON SWITCH
Filed Sept. 20, 1962
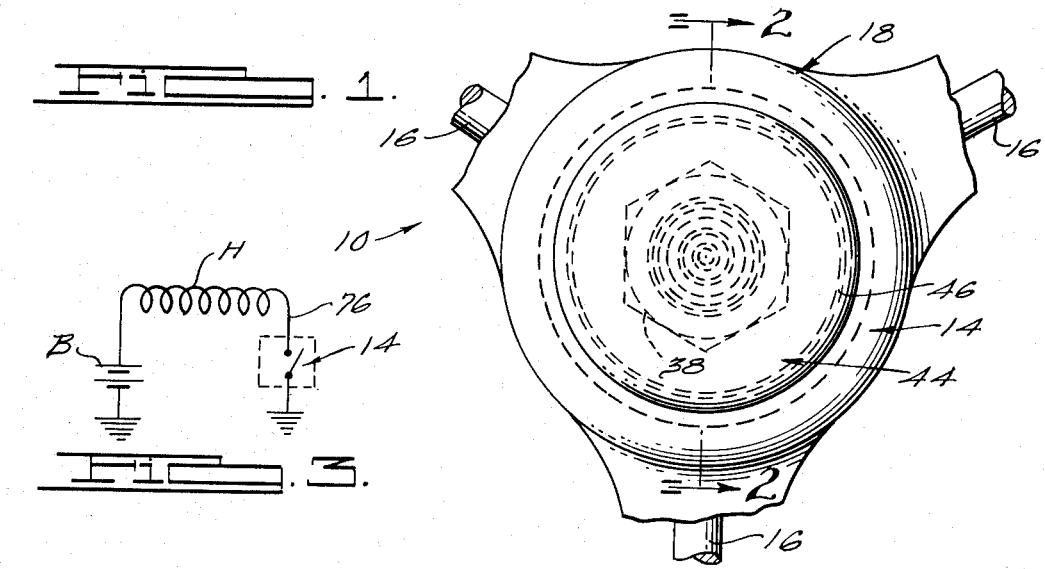
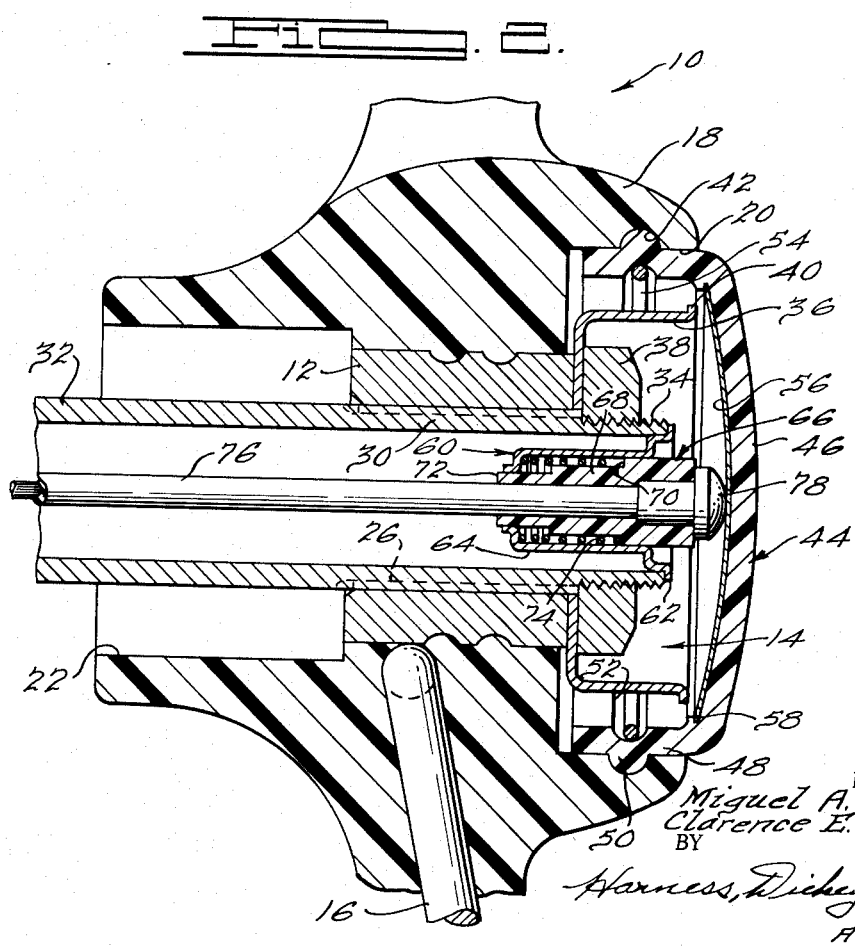
INVENTORS.
Miguel A. Ordorica,
Clarence E. Merritt.
BY
Harness, Dickey & Pierce
ATTORNEYS.

United States Patent Office 3,223,797
Patented Dec. 14, 1965

3,223,797
HORN BUTTON SWITCH
Miguel A. Ordorica, Lambertville, Mich., and Clarence E. Merritt, Toledo, Ohio, assignors to Kaiser Jeep Corporation, a corporation of Nevada
Filed Sept. 20, 1962, Ser. No. 225,011
8 Claims. (Cl. 200—61.54)

This invention relates to apparatus for actuating electrical circuits and more particularly to a horn button switch construction for use on automotive vehicles.

It is desirable that the horn button switch for actuating the horn on an automotive vehicle be of a construction whereby impinging water and moisture in the air cannot short circuit the horn button contacts causing electrical actuation of the horn. Therefore, it is an object of this invention to provide a horn button switch construction which is watertight from impinging water and from moisture in the air. It is a general object of this invention to provide a new and improved improved construction for a horn button switch.

Other objects, features, and avantages of the present invention will become apparent from the subsequent description and the appended claims, taken in conjunction with the accompanying drawings, in which:

FIGURE 1 is a fragmentary front elevational view of a portion of a steering wheel assembly having a horn button assembly construction embodying the features of this invention;

FIGURE 2 is a blown-up fragmentary, sectional view of the wheel and horn button assemblies of FIGURE 1 taken substantially along the line 2—2 in FIGURE 1; and FIGURE 3 is an electrical schematic diagram depicting the circuit relationship between the horn button assembly of FIGURES 1 and 2 and the horn coil and battery of a vehicle.

Looking now to FIGURES 1 and 2, a wheel assembly, only partly shown, is generally indicated by the numeral 10 and has a centrally located hub member 12 having a splined bore 26. A plurality of spokes 16 are welded or otherwise connected at one end to the outer surface of hub member 12 and extend radially outwardly and are welded or otherwise connected at their opposite ends to a ring (not shown). The hub 12, the spokes 16, and ring can be coated with a synthetic hard rubber by means well known in the art. In the embodiment shown in the drawing, an enlarged hub structure 18 of synthetic hard rubber is formed peripherally about the splined hub 12 and has an enlarged diameter bore 20 defining a recess in the front face thereof and an enlarged diameter counterbore 22 in the rear face thereof. The counterbore 22 is of a diameter to accept the outer end of the tubular steering column jacket (not shown).

The splined bore 26 is matable with an externally splined end portion 30 of the steering tube 32 whereby the wheel assembly 10 can be coaxially mounted thereupon. The steering tube 32 can be connected to a steering gear assembly (not shown) to facilitate steering of the vehicle in a conventional manner. The steering tube 32 terminates in a reduced diameter, threaded end portion 34 located adjacent the splined portion 30.

A cup-shaped metallic contact member 36 has an internal bore substantially equal to the outside diameter of the splined portion 30 and can be concentrically disposed thereover in abutment with the outer face of the splined hub 12. A wheel nut 38 threadably disposed upon the threaded end portion 34 of the steering tube 32 axially secures the contact cup 36 against the outer face of the splined hub 12, and thus axially secures the wheel assembly 10 to the steering tube 32. The contact cup 36 terminates at its axially outer end in a generally radially outwardly extending, annular flange portion 40 which serves a purpose to be presently seen.

The enlarged diameter bore 20 located in the outer face of the enlarged hub 18 is provided with a radially outwardly extending, annular groove 42 being of a generally semicircular contour. A cup-shaped outer cap member 44 is made of rubber or some other similar type resilient material and has a generally axially outwardly dished face portion 46 connected at its peripheral edge to an axially extending flange portion 48 of a diameter substantially equal to the diameter of the enlarged bore 20. The flange portion 48 has an annular, radially outwardly extending rib 50 of a generally semi-circular cross section and of a shape similar to that of the groove 42 in the surface of the bore 20. Thus the cup member 44 can be moved axially within the bore 20 with the rib 50 being matably disposed within the groove 42 and with the annular flange 48 being matably located peripherally relative to the surface of the enlarged diameter bore 20. The flange portion 48 is provided with an annular groove 52 on its radially inner surface substantially concentrically with the annular rib 50 for receiving an annular split retainer spring member 54. The spring 54 in its normal position extends the flange portion 48 and hence the rib portion 50 radially outwardly. Thus, as the cup 44 is moved axially into the enlarged diameter bore 20, the spring member 54 is first compressed radially inwardly to allow insertion of the flange portion 48 and the rib 50 into the enlarged diameter bore 20 and the groove 42, respectively. Upon assembly the spring member 54 springs radially outwardly towards its normal position, hence forcing the flange portion 48 and the rib 50 radially outwardly into secure engagement with the enlarged diameter bore 20 and the annular groove 42, respectively. In this condition the spring member 54 is under a radially inwardly directed preload. By thus forcing the flange 48 and rib 50 into engagement with the corresponding mating surfaces of the enlarged hub 18, a seal is provided preventing water from entering into the cavity defined by bore 20.

Disposed on the inner surface of the dished face portion 46 of the cup 44 is a generally circular, axially dished metallic conductor member 56. The dished member 56 is secured to the face 46 of the cup member 44 by means of an annular lip portion 58 overengaging its peripheral edge. With the cup contact member 36 secured against the outer face of the splined hub member 24 in the manner described, the dished contact member 56 is maintained peripherally proximate to and in clearance relationship with the annular flange portion 40 of the contact member 36.

Secured at the outer end of the steering tube 32 is a tubular housing member 60 which extends axially inwardly within the steering tube 32 and is axially secured at the outer end thereof by means of an annular stepped flange portion 62. The housing 60 has an annular body portion 64 into which is slidably and coaxially disposed a plunger member 66 of electrical insulating material and which has a reduced diameter portion 68 which defines an annular shoulder 70. A reduced diameter end portion 72 is slidable within an aperture disposed at the rear of the housing 60. A coil spring member 74 is located within the housing 60 and is in contact with the shoulder 70 of the plunger member 66 and is maintained in precompression to thereby urge the plunger member 66 axially outwardly relative to the housing 60.

An electrical conductor 76 is located within the steering tube 32 and extends coaxially through the plunger 66 and is electrically connected to an electrically conductive button 78 which is located in the forward portion of the plunger 66 and has an enlarged button portion extending axially outwardly therefrom. The button 78 is maintained axially outwardly by means of the spring 74 via the plunger 66 and in electrical contact with the disk 56, thereby providing electrical continuity between the electrical conductor 76 and the disk 56.

Looking now to FIGURE 3, the conductor 76 is connected to one end of a horn coil H, the other end of which is connected to the hot side of a battery B having its other side connected to ground. Thus, by grounding the conductor 76 via the horn button assembly 14, a circuit is completed through the horn coil H, thereby causing the horn to be actuated. With the horn button assembly 14 in the position as shown in FIGURE 2, no path to ground is provided for the conductor 76 since continuity extends only to the button 78 and the contact disk 56. In order to actuate the horn H, the forward face 46 of the cup 44 is pressed axially inwardly, moving the flexible contact disk 56 into engagement with the flange 40 of the contact cut 36, thereby completing a ground path through the contact disk 36 and the steering tube 32. The flange portion 40 extends annularly peripherally as does the dished contact disk 56; thus the forward face 46 can be depressed at any position, resulting in contact of the disk 56 with the flange portion 40 and hence actuation of the horn coil H. Note that, as the face 46 is moved axially inwardly, the button 78, plunger 66 and conductor 76 are moved axially against the force of the spring 74. As the face 46 moves back, the spring 74 maintains contact between the button 78 and disk 56. Thus the button 78 is constantly maintained in contact with the disk 56. Note that both the force of the spring 74 and resilience of the cup 44 and disk 56 move the disk 56 out of contact with the flange 40 of the cup 36 when the face 46 is released from its actuating position. With the type of electrical connection shown, the steering wheel can be turned without twisting the conductor 76.

Thus, with the construction as shown, water cannot move past the flange portion 48 and rib portion 50 as disposed matably within the increased diameter bore 20 and groove 42, respectively, and into the confines of the horn button assembly 14 to cause unwanted actuation of the horn coil H.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. Apparatus for actuating a horn comprising a steering wheel member having a hub, means for securing said hub upon an end portion of a steering tube, a flexible cap having a front face and an annular flange axially extending from said front face and disposable matably relative to an annular surface portion of said hub, means resiliently urging said annular flange into peripheral engagement with said surface portion of said hub, and electrical circuit means selectively actuable for completing an electric circuit to the horn, said electrical circuit means comprising a first electrical contact member connected to the inside surface of said front face of said flexible cap and having a contacting surface mounted on and contiguous to said inside surface, a second electrical contact member, and means for securing said second electrical contact member proximate to and axially spaced from said contacting surface of said first electrical contact member whereby axial inward movement of said front face moves said first contact member into engagement with said second contact member.

2. Apparatus for actuating a horn comprising a steering wheel member having a hub, means for securing said hub upon an end portion of a steering tube, a flexible cap having a front face and an annular flange axially extending from said front face and disposable matably relative to an annular surface portion of said hub, one of said flange and said surface portion having an annular rib matable within an annular groove in the other of said flange and said surface portion, means resiliently urging said annular flange into peripheral engagement with said surface portion of said hub and urging said rib into said groove, electrical circuit means selectively actuable for completing an electric circuit to the horn, said electrical circuit means comprising a first electrical contact member connected to the inside surface of said front face of said flexible cap and a second electrical contact member, and means for securing said second electrical contact member proximate to and axially spaced from said first electrical contact member whereby axial inward movement of said front face moves said first contact member into engagement with said second contact member.

3. Apparatus for actuating a horn comprising a steering wheel member having a hub, means for securing said hub upon an end portion of a steering tube, a flexible cap having a front face and an annular flange axially extending from said front face and disposable matably relative to an annular surface portion of said hub, said annular flange having an annular rib matable within an annular groove in said annular surface portion, a spring disposed in an annular groove in said annular flange located radially oppositely from said rib for urging said annular flange into peripheral engagement with said surface portion of said hub and for urging said rib into said groove, electrical circuit means selectively actuable for completing an electric circuit to the horn, said electrical circuit means comprising a first electrical contact member connected to the inside surface of said front face of said flexible cap, a second electrical contact member, and means for securing said second electrical contact member proximate to and axially spaced from said first electrical contact member whereby axial inward movement of said front face moves said first contact member into engagement with said second contact member.

4. Apparatus for actuating a horn comprising a steering wheel member having a hub adapted to be disposed upon an end portion of a steering tube, a flexible cap having a front face and an annular flange axially extending from said front face and disposable matably within an annular surface portion defining a recess in said hub, said annular flange having a radially outwardly extending, annular rib matable within a radially outwardly extending groove in said annular surface portion, a spring disposed in a radially outwardly extending, annular groove in said annular flange located radially oppositely from said rib for urging said annular flange into peripheral engagement with said surface portion of said hub and for urging said rib into said groove, electrical circuit means selectively actuable for completing an electric circuit to the horn, said electrical circuit means comprising a first electrical contact member connected to the inside surface of said front face of said flexible cap, a second electrical contact member, and means for securing said second electrical contact member proximate to and axially spaced from said first electrical contact member whereby axial inward movement of said front face moves said first contact member into engagement wtih said second contact member.

5. Apparatus for actuating a horn comprising a steering wheel member having a hub, means for securing said hub upon an end portion of a steering tube, a flexible cap having an axially outwardly dished front face and an annular flange axially extending from said front face and disposable matably relative to an annular surface portion of said hub, means resiliently urging said annular flange into peripheral engagement with said surface portion of said hub, electrical circuit means selectively actuable for completing an electric circuit to the horn, said electrical circuit means comprising a generally circular, axially outwardly dished, first electrical contact member matably secured to the inside surface of said front face of said flexible cap, a second electrical contact member having an annular portion, and means for securing said second electrical contact with said annular portion proximate to and axially spaced from said first electrical contact member whereby axial inward movement of said front face moves said first contact member into engagement with said annular portion of said second contact member.

6. Apparatus for actuating a horn comprising a steering wheel member having a hub, means for securing said hub upon an end portion of a steering tube, a flexible cap having an axially outwardly dished front face and an annular flange axially extending from said front face and disposable matably within an annular surface portion defining a recess in said hub, said annular flange having a radially outwardly extending, annular rib matable within a radially outwardly extending groove in said annular surface portion, a spring disposed in a radially outwardly extending, annular groove in said annular flange located radially oppositely from said rib for urging said annular flange into peripheral engagement with said surface portion of said hub and for urging said rib into said groove, electrical circuit means selectively actuable for completing an electric circuit to the horn, said electrical circuit means comprising a generally circular, axially outwardly dished first electrical contact member matably secured to the inside surface of said front face of said flexible cap, a second electrical contact member having an annular portion, and means for securing said second electrical contact with said annular portion proximate to and axially spaced from said first electrical contact member whereby axial inward movement of said front face moves said first contact member into engagement with said annular portion of said second contact member.

7. Apparatus for actuating a horn comprising a steering wheel member having a hub, means for securing said hub upon an end portion of a steering tube, a flexible cap having an axially outwardly dished front face and an annular flange axially extending from said front face and disposable matably relative to an annular surface portion of said hub, means resiliently urging said annular flange into peripheral engagement with said surface portion of said hub, electrical circuit means selectively actuable for completing an electric circuit to the horn, said electrical circuit means comprising a generally circular, axially outwardly dished first electrical contact member matably secured to the inside surface of said front face of said flexible cap, a second electrical contact member having an annular portion, means for securing said second electrical contact with said annular portion proximate to and axially spaced from said first electrical contact member whereby axial inward movement of said front face moves said first contact member into engagement with said annular portion of said second contact member, conductor means including an electrical conductor disposed in the steering tube for electrically engaging said first electrical contact member, and means for urging said conductor means axially outwardly from the steering tube and into electrical engagement with said first electrical contact member.

8. Apparatus for actuating a horn comprising a steering wheel member having a hub, means for securing said hub upon an end portion of a steering tube, a flexible cap having an axially outwardly dished front face and an annular flange axially extending from said front face and disposable matably within an annular surface portion defining a recess in said hub, said annular flange having a radially outwardly extending annular rib matable within a radially outwardly extending groove in said annular surface portion, a spring disposed in a radially outwardly extending, annular groove in said annular flange located radially oppositely from said rib for urging said annular flange into peripheral engagement with said surface portion of said hub and for urging said rib into said groove, electrical circuit means selectively actuable for completing an electric circuit to the horn, said electrical circuit means comprising a generally circular, axially outwardly dished first electrical contact member matably secured to the inside surface of said front face of said flexible cap, a second electrical contact member having an annular portion, means for securing said second electrical contact with said annular portion proximate to and axially spaced from said first electrical contact member whereby axial inward movement of said front face moves said first contact member into engagement with said annular portion of said second contact member, conductor means including an electrical conductor disposed in the steering tube for electrically engaging said first electrical contact member, and means for urging said conductor means axially outwardly from the steering tube and into electrical engagement with said first electrical contact member.

References Cited by the Examiner

UNITED STATES PATENTS

| | | | |
|---|---|---|---|
| 2,133,472 | 10/1938 | Parker | 200—61.55 |
| 2,616,002 | 10/1952 | Junker et al. | 200—61.55 |
| 2,625,618 | 1/1953 | Creson | 200—61.55 |
| 2,631,204 | 3/1953 | Kibiger | 200—61.55 |
| 2,729,713 | 1/1956 | Berner et al. | 200—61.54 |
| 2,829,212 | 4/1958 | Cislo | 200—61.54 |
| 2,894,090 | 7/1959 | Timoff et al. | 200—61.54 |

BERNARD A. GILHEANY, *Primary Examiner.*

ROBERT K. SCHAEFER, *Examiner.*

UNITED STATES PATENT OFFICE
CERTIFICATE OF CORRECTION

Patent No. 3,223,797                            December 14, 1965

Miguel A. Ordorica et al.

It is hereby certified that error appears in the above numbered patent requiring correction and that the said Letters Patent should read as corrected below.

Column 1, line 20, strike out "improved", second occurrence; line 22, for "avantages" read -- advantages --; column 4, line 38, strike out "adapted to be disposed" and insert instead -- , means for securing said hub --.

Signed and sealed this 18th day of October 1966.

(SEAL)
Attest:

ERNEST W. SWIDER                                      EDWARD J. BRENNER
Attesting Officer                                          Commissioner of Patents